United States Patent
Terada et al.

(10) Patent No.: US 9,725,053 B2
(45) Date of Patent: Aug. 8, 2017

(54) ARM POWER SUPPLY DEVICE

(71) Applicant: Yazaki Corporation, Tokyo (JP)

(72) Inventors: Tomoyasu Terada, Makinohara (JP);
Tsukasa Sekino, Makinohara (JP);
Hiroshi Yamashita, Makinohara (JP);
Daisuke Okamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 129 days.

(21) Appl. No.: 14/585,453

(22) Filed: Dec. 30, 2014

(65) Prior Publication Data
US 2015/0108289 A1 Apr. 23, 2015

Related U.S. Application Data (63) Continuation of application No. PCT/JP2013/069243, filed on Jul. 16, 2013.

(30) Foreign Application Priority Data

Jul. 17, 2012 (JP) .................................. 2012-158594

(51) Int. Cl.
*B60R 16/02* (2006.01)
*H02G 11/00* (2006.01)
(Continued)

(52) U.S. Cl.
CPC ........ *B60R 16/0215* (2013.01); *B60R 16/027* (2013.01); *F16L 3/015* (2013.01); *H02G 11/00* (2013.01)

(58) Field of Classification Search
CPC . B60R 16/0215; B60R 16/027; B60R 16/023; B60R 16/02; F16L 3/015;
(Continued)

(56) References Cited

U.S. PATENT DOCUMENTS 5,879,047 A * 3/1999 Yamaguchi ......... B60R 16/0215
296/146.7
7,980,518 B2 * 7/2011 Katou ................. B60R 16/0215
174/525

(Continued)

FOREIGN PATENT DOCUMENTS

CN 1262189 A 8/2000
CN 101414741 A 4/2009
(Continued)

OTHER PUBLICATIONS

International Search Report mailed Sep. 10, 2013, issued for PCT/JP2013/069243.
(Continued)

*Primary Examiner* — Nkeisha Smith
(74) *Attorney, Agent, or Firm* — Locke Lord LLP (57) ABSTRACT

There is employed an arm power supply device in which a first arm is rotatably and axially supported to a base member having one harness fixing portion, a second arm having the other harness fixing portion is rotatably and axially supported on a rotation tip side of the first arm, the first arm includes an enclosure portion forming a slit through which a wire harness is inserted, and the wire harness passes from the base member to the slit and is wired over the second arm. The enclosure portion includes an inclined wall to guide the wire harness derived in a bent shape from the second arm to be in contact with the inner surface.

4 Claims, 4 Drawing Sheets

(51) Int. Cl.
*F16L 3/015* (2006.01)
*B60R 16/027* (2006.01)

(58) Field of Classification Search
CPC ... F16L 3/00; F16L 3/24; H02G 11/00; H02G 11/006; H02G 3/32; H02G 3/0456; B60J 5/06; A61G 7/0503; A61M 2209/082
USPC .............................. 248/70, 205.1; 296/146.7
See application file for complete search history.

(56) References Cited

U.S. PATENT DOCUMENTS

| | | | | |
|---|---|---|---|---|
| 8,196,351 | B2* | 6/2012 | Aoki | B60R 16/0215 49/360 |
| 8,201,778 | B2* | 6/2012 | Yamamoto | F16L 3/015 174/525 |
| 8,227,693 | B2* | 7/2012 | Katou | B60R 16/027 174/68.1 |
| 8,242,366 | B2* | 8/2012 | Katou | B60R 16/027 174/68.1 |
| 8,324,501 | B2* | 12/2012 | Terada | B60R 16/0215 174/72 A |
| 2008/0035800 | A1* | 2/2008 | Yamamoto | F16L 3/015 248/70 |
| 2009/0095858 | A1* | 4/2009 | Katou | B60R 16/0215 248/205.1 |
| 2010/0243319 | A1* | 9/2010 | Katou | H02G 11/003 174/72 A |
| 2011/0061895 | A1* | 3/2011 | Terada | B60R 16/0215 174/135 |
| 2015/0115648 | A1* | 4/2015 | Terada | H02G 11/00 296/146.7 |

FOREIGN PATENT DOCUMENTS

| | | |
|---|---|---|
| EP | 1024058 A2 | 8/2000 |
| JP | 2007-068346 A | 3/2007 |
| JP | 2009-065814 A | 3/2009 |
| JP | 2009-100524 A | 5/2009 |
| JP | 2011-062015 A | 3/2011 |
| WO | WO-2012/114548 A1 | 8/2012 |

OTHER PUBLICATIONS

Supplementary European Search Report mailed Feb. 23, 2016, issued for the European patent application No. 13819277.8.
Office Action dated Jun. 3, 2016, issued for the Chinese patent application No. 201380037847.0 and English translation thereof.
Office Communication dated on Jan. 30, 2017 issued for corresponding European Patent Application No. 13 819 277.8.

* cited by examiner

ARM POWER SUPPLY DEVICE

TECHNICAL FIELD

The present invention, for example, relates to an arm power supply device which is mounted on a sliding door in an automobile and wires a wire harness to a vehicle body by an arm supported to a base member to be freely rotated.

BACKGROUND ART

In a power supply device of the related art, for example, as disclosed in Patent Literature 1 (not illustrated), a wire harness is urged upward by a metal flat spring while wiring the wire harness in a bent shape in the protector vertically disposed in the sliding door using a synthetic-resin protector formed by a protector base and a protector cover, the wire harness is wired up to a harness supporter on a side near a vehicle body through a lower opening of the protector, and sagging (extra length) of the wire harness at the time when the sliding door is a half-open state is absorbed.

Further, as an arm power supply device of the related art, Patent Literature 2 (not illustrated) discloses that a link arm is rotatably and axially supported on a plate protector base vertically disposed in the sliding door, the link arm is urged upward by a torsion coil spring (spring member), a harness holder is rotatably and axially supported to the link arm, the wire harness is wired along the protector base to the harness holder and fixed thereto and wired from the harness holder to a side near the vehicle body, and a protector cover may be not used.

CITATION LIST

Patent Literature

Patent Literature 1: JP 2007-68346 A (FIG. 2)
Patent Literature 2: JP 2009-65814 A (FIGS. 1 and 2)

SUMMARY OF INVENTION

Technical Problem

However, in the arm power supply device disclosed in Patent Literature 2 of the related art, there is a concern that the arm is deformed in a plate thickness direction when the wire harness is pulled, the wire harness is rattled along the protector base (base member), the trajectory of the wire harness becomes unstable along the protector base when the sliding door is opened or closed, and accordingly bending resistance of the wire harness may be reduced. Further, there is a concern that a spring member is easily fallen out when the spring member is assembled to a shaft of the link arm, and thus assembly workability becomes degraded.

Further, in the respective power supply devices of the related art, there is a concern that the protector and the protector base (base member) including the protector cover (a cover member) is easily increased in size, and mounting spaces for other components become reduced when the power supply device is disposed in the sliding door of an automobile.

The invention has been made in view of the above circumstances, and an object is to provide an arm power supply device which can prevent the bending of the power supply arm in the width direction, resolve the rattling of the wire harness and the instability of the trajectory, improve the bending resistance of the wire harness, minimize the structure of the power supply device while eliminating the cover member, and prevent the spring member from being fallen out of the arm.

Solution to Problem

In order to solve the above object, there is provided an arm power supply device according to a first aspect of the invention in which a first arm is rotatably and axially supported to a base member having one harness fixing portion, a second arm having the other harness fixing portion is rotatably and axially supported on a rotation tip side of the first arm, the first arm includes an enclosure portion forming a slit through which a wire harness is inserted, and the wire harness passes from the base member to the slit and is wired over the second arm.

With the above configuration, the rigidity of the first arm is increased by the enclosure portion surrounding the slit, and the bending of the first arm in the width direction is prevented. Further, the wire harness is inserted in the slit of the first arm and freely moves in the longitudinal direction of the slit, but the movement of the wire harness in the width direction of the slit is regulated. Therefore, the rattling of the wire harness in the width direction of the slit (the width direction of the first arm) is suppressed, and the trajectory in the longitudinal direction of the slit (the longitudinal direction of the first arm) becomes stable. The wire harness is wired in an approximate S shape from the base member to the second arm through the slit of the first arm.

The arm power supply device according to a second aspect, in the arm power supply device of the first aspect, is characterized in that the enclosure portion includes an inclined wall on a rotational base end side of the first arm such that the wire harness derived in a bent shape from the second arm is guided to be in contact with an inner surface.

With the above configuration, a bent portion of the wire harness derived in the bent shape from the second arm is guided to be in contact with the inner surface of the inclined wall in the enclosure portion of the first arm at the time of rotating or stopping the first arm, and the bent shape of the wire harness is maintained, and adverse bending such as the folding and the small-radius bending of the wire harness is prevented. Therefore, the bending resistance of the wire harness is improved.

The arm power supply device according to a third aspect, in the arm power supply device of the first or second aspect, is characterized in that a peripheral end of the base member is disposed in the vicinity of an end portion of the enclosure portion on a rotational base end side of the first arm in a rotation range of the first arm.

With the above configuration, the portion on the rotational base end side of the first arm is reliably supported by the base member to be freely rotated, and the base member is miniaturized. Therefore, while securing the smooth rotation of the first arm, a mounting portion in which the base member is mounted on the sliding door of the vehicle is saved.

The arm power supply device according to a fourth aspect, in the arm power supply device of any one of the first to third aspects, is characterized in that a torsion coil spring to urge the first arm in a rotation direction is contained on a rotational base end side of the first arm, and an engagement portion to engage one end portion of the torsion coil spring is provided on the rotational base end side.

With the above configuration, when the torsion coil spring is contained on the rotational base end side of the first arm, one end of the torsion coil spring is engaged by the engagement portion, and when the first arm is assembled to the base member, the torsion coil spring is prevented from being fallen out of the rotational base end side of the first arm. The engagement portion is desirable to be a flexible engagement arm.

Advantageous Effects of Invention

According to the invention of the first aspect, the rigidity of the first arm in the width direction is increased by the enclosure portion of the first arm, so that it is possible to prevent deformation such as an adverse bending of the first arm when the wire harness is forcibly pulled. Further, since the wire harness is inserted into the slit of the first arm, the rattling of the wire harness is prevented, the trajectory of the wire harness becomes stable. For example, it is possible to smoothly operate the wire harness without deformation such as an adverse bending when the sliding door of the automobile is opened or closed. Therefore, the bending resistance of the wire harness can be improved.

According to the invention of the second aspect, when the first arm is operated, the bended wire harness derived from the second arm is in contact with the inner surface of the inclined wall of the enclosure portion of the first arm, so that the bent shape of the wire harness is maintained, and the adverse folding and the like are prevented. Therefore, the bending resistance of the wire harness can be improved.

According to the invention of the third aspect, the cover member is eliminated from the power supply device and the base member is miniaturized while keeping a smooth rotation of the first arm, so that the power supply device can be miniaturized and lightened. Further, for example, a mounting space of the base member in the sliding door of the vehicle can be saved.

According to the invention of the fourth aspect, when the first arm is assembled to the base member, it is possible to prevent the spring member from being fallen out of the first arm. Further, assembly workability of the first arm to the base member can be improved.

DESCRIPTION OF EMBODIMENTS

Figure 1:
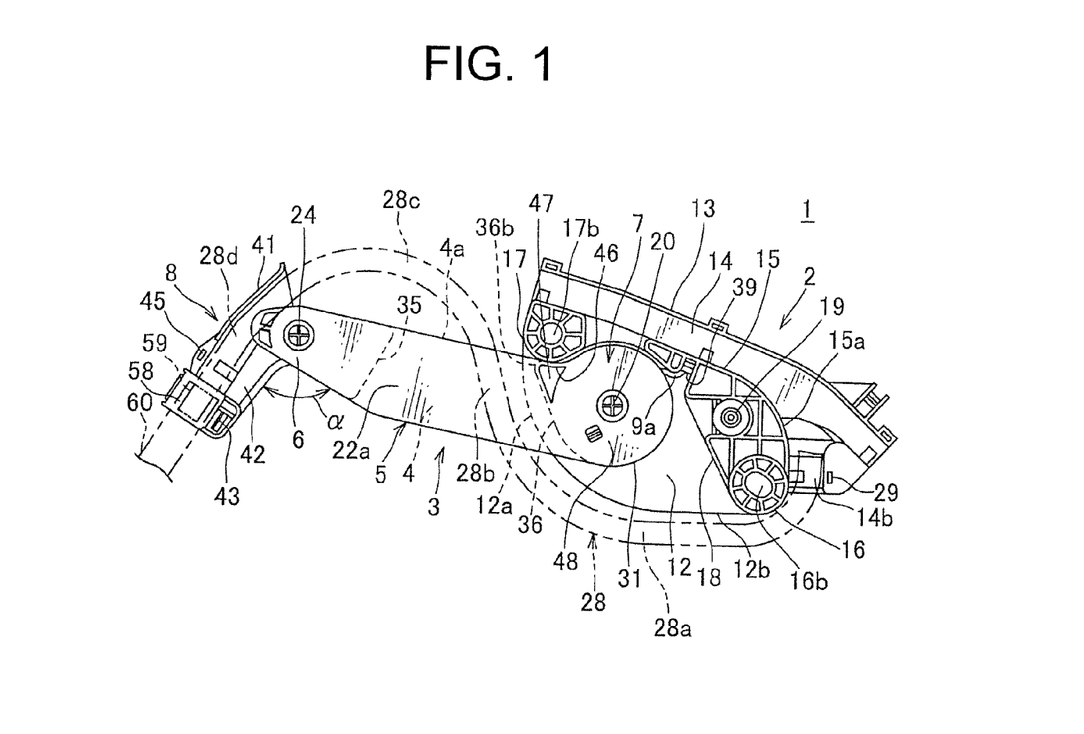
FIG. 1 is a front view illustrating an embodiment of an arm power supply device according to the invention.
Figure 2:
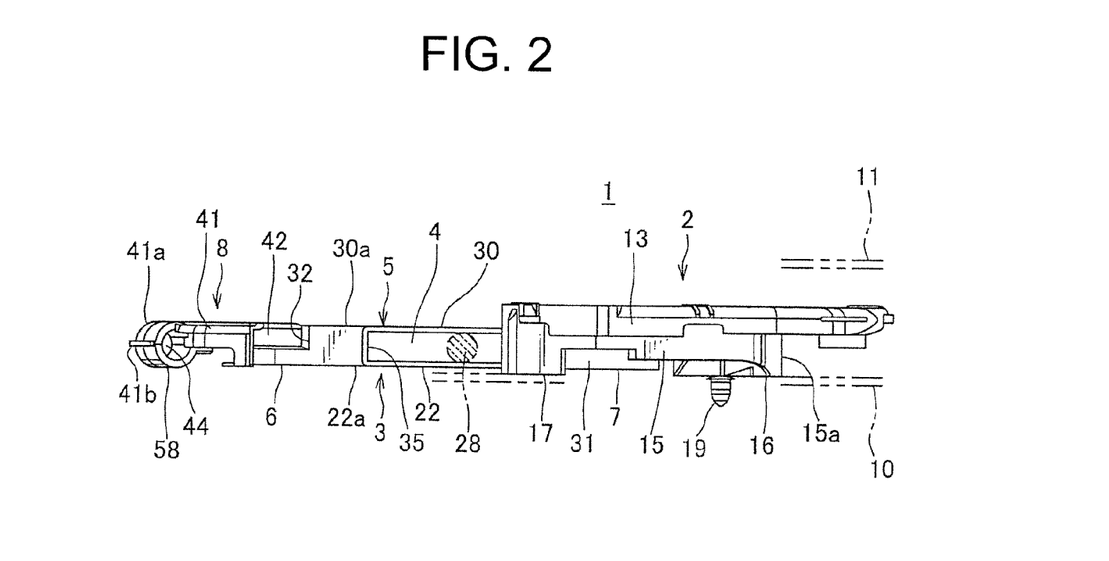
FIG. 2 is a top view illustrating the arm power supply device.

FIGS. 1 and 2 illustrate an embodiment of an arm power supply device according to the invention.

The arm power supply device 1 is configured to include a small synthetic resin base member 2 which is vertically fixed to a metal door inner panel 10 (FIG. 2) of a sliding door of an automobile, a long synthetic resin first arm 3 which is rotatably and axially supported to the base member 2 in the upward and downward direction and has an enclosure portion 5 in the center forming a slit 4 for inserting a wire harness, and a short synthetic resin second arm 8 which is rotatably and axially supported to a rotation tip 6 of the first arm 3 in the upward and downward direction and has a harness fixing portion 58 on a rotation tip side of its own.

The arm power supply device 1 in this example is used for the sliding door of the left side of a vehicle, a near side in FIG. 1 indicates a vehicle outside (a side near the door panel 10 of FIG. 2) and a deep side indicates a vehicle inside (a side near a door trim 11 of FIG. 2). The left side (a side near the first arm 3) of FIG. 1 indicates the front side of the vehicle and the right side (a side near the base member 2) indicates the back side of the vehicle. FIGS. 1 and 2 illustrate a state in which the first arm 3 is urged upward by an urging force of the spring member 9 (FIG. 7) on the rotational base end side 7 at the time when the sliding door is half open and a harness extra length is absorbed.

Figure 3:
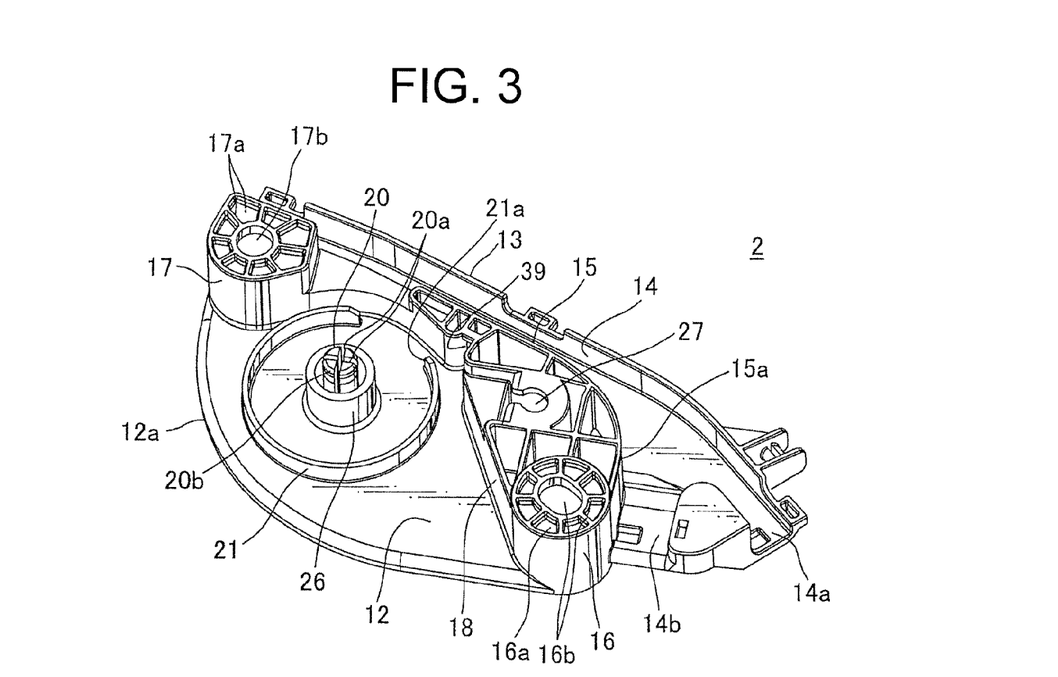
FIG. 3 is a perspective view illustrating an aspect of a base member of the arm power supply device.

As illustrated in FIGS. 1 and 2, the base member 2 is formed to have a longitudinal length almost the same degree as the entire length of the first arm 3 and a vertical length almost twice times the width of the first arm 3, and is miniaturized in the longitudinal and vertical directions. The thickness of the base member 2 is almost one and half times the thickness of the first arm 3, and is compacted in the width direction. FIG. 3 illustrates an embodiment of the base member 2.

As illustrated in FIGS. 1 and 3, the base member 2 includes a base plate 12 which is substantially perpendicular in the vertical direction, an upper wall 13 which is inclined downward along the upper end of the base plate 12, a partition wall 15 which is disposed below the upper wall 13 with a harness guide (insertion) path 14 formed therebetween, a bottomed cylindrical fixing portion 16 which is provided on the lower end side of a bent rear portion 15a of the partition wall 15, a bottomed cylindrical fixing portion 17 which is provided on the upper end side of the front part of the partition wall 15 and also serves as a stopper to regulate an upward rotation angle (the clockwise direction) of the first arm 3 (FIG. 1), an inclined wall 18 which is inclined upward from the fixing portion 16 on the lower side and serves as a stopper to regulate a downwardly rotation angle (the counterclockwise direction) of the first arm 3, a fixing clip 19 (FIGS. 1 and 2) which is provided between the inclined wall 18 and the rear semi-bent portion 15a of the partition wall 15, a shaft 20 (FIG. 3) which protrudes from the base plate 12 and supports the first arm, and a guide wall 21 which is formed at a low height in a substantially annular shape.

The fixing portions 16 and 17 provided in the front and rear parts of the base member 2 respectively include bolt insertion holes 16b and 17b in bottom walls 16a and 17a. As illustrated in FIG. 2, the bottom walls 16a and 17a of the fixing portions 16 and 17 are in contact with the metal door inner panel 10 to be fastened and fixed by bolts and nuts (not illustrated), and the locking clip 19 passes through a hole (not illustrated) formed in the door inner panel 10 for engagement. The fixing portions 16 and 17 each protrude from the base plate 12 of the base member 2 toward the door inner panel 10, the rotational base end portion 7 in the annular shape (a circular shape in front view) of the first arm 3 is positioned in a nearly fan-shaped concave space (use symbol 12 in substitution) between the fixing portions 16 and 17 provided in the front and rear (upper and lower) parts along the base plate 12, and an outer surface 22 of the first arm 3 slightly recedes to the base plate 12 compared to the bottom walls 16a and 17a of the fixing portions 6 and 7.

The shaft 20 of the base member 2 includes a slit 20a (FIG. 3) which is flexible inward in a radial direction, and has a locking claw 20b at the tip. At the time when the shaft passes through a hole portion 23 (FIG. 4) on the base end side of the first arm 3, the locking claw 20b (FIG. 3) is engaged with the peripheral of the hole portion 23. A shaft 24 provided in the second arm 8 (FIG. 1) is also configured to be engaged with a hole portion 25 (FIG. 4) on the tip side of the first arm 3. A cylindrical wall portion 26 is provided in the surrounding area of the shaft 20 (FIG. 3) of the base member 2, and a guide peripheral wall 21 is provided on the outside thereof. Symbol 27 denoted in FIG. 3 indicates a portion on which the locking clip 19 is mounted.

The harness guide path 14 (FIG. 3) of the base member 2 is vertically branched in a short distance on the rear end side (upper and lower branch passages are denoted by symbols 14a and 14b), and as illustrated in FIG. 1, a main body (denoted by symbol 28) of a wire harness 28 passes through the lower side slightly lower than the lower end of the base plate 12 of the base member 2 along the lower branch passage 14b from the harness guide path 14, and then wired along the second arm 8 through the slit 4 in the enclosure portion 5 of the first arm 3 while being bent in an approximate S shape. One wire harness 28 is wired from the harness guide path 14 toward the sliding door side, and the other wire harness 28 is wired from the second arm 8 up to a harness supporter (not illustrated) on a vehicle body side. The wire harness 28 is fixed by a binding band (not illustrated) in the branch passage (the harness fixing portion) 14b on the lower side of the harness guide path 14 (a band insertion hole is denoted by symbol 29), and is interposed and fixed by a cover portion (the harness fixing portion) 58 on a rotation tip side of the second arm 8.

The first arm 3 includes wall surfaces 22a and 30a (FIG. 2) which are flat and straight on front and back sides (outside and inside), an annular portion (the annular shape wall) 31 (FIG. 1) which is formed straight in the surrounding area of a circular wall portion 48 on the same plane as the wall surface 22a on the front side and has a depth equal to the interval of the wall surfaces 22a and 30a on the front side, a portion on the rotation tip side 6 which is formed continuously on the same plane as the wall surface 22a on the front side and connected to the wall surface 30a on the back side through a step portion 32 (FIG. 2) while the tip width is tapered, the slit 4 which is formed between the annular portion 31 on the rotational base end side and the portion on the rotation tip side 6 to insert the harness between plate wall portions 22 and 30 forming the wall surfaces 22a and 30a on the front and back sides, plate inclined wall portions (the inclined walls) 35 and 36 which are formed in the front and rear parts and intersect with the plate wall portions 22 and 30 on the front and back sides to form the inner surfaces in the front and rear parts of the slit 4, and the enclosure portion 5 which is surrounded on all sides by the wall portions 22, 30, 35, and 36.

Figure 4:
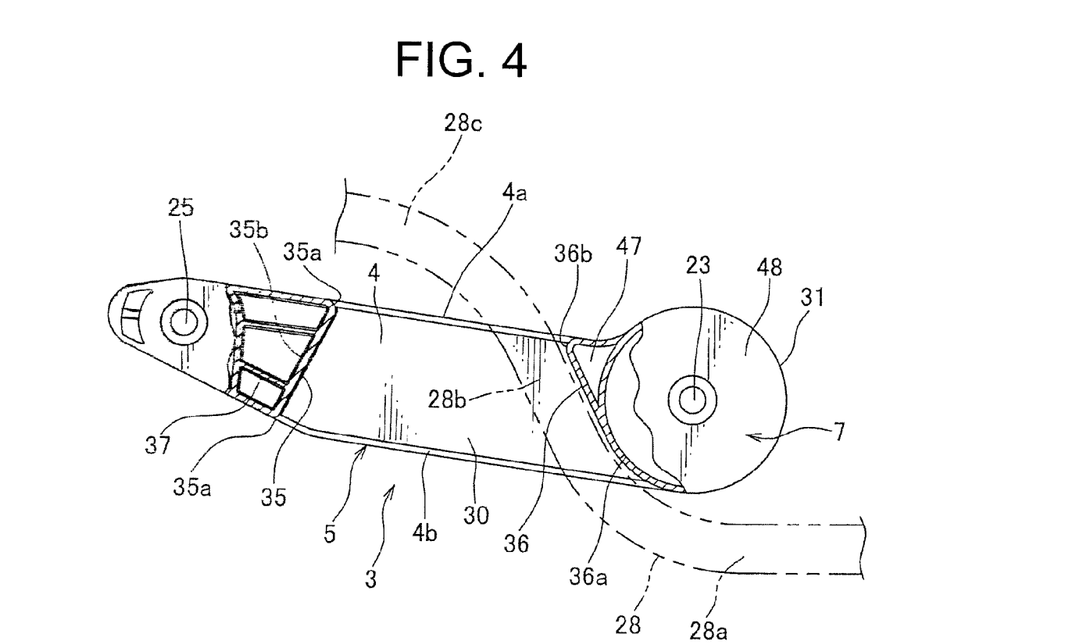
FIG. 4 is a front view illustrating an aspect of a first arm of the arm power supply device in which main portions are drawn in cross-sectional view.
Figure 5A:
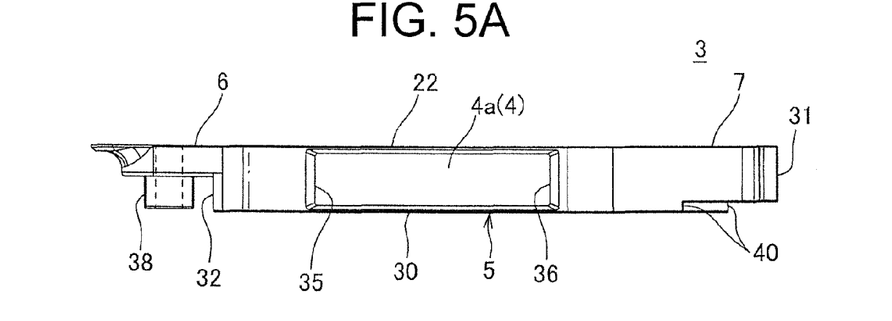
FIG. 5A is a top view illustrating the first arm.
Figure 5B:
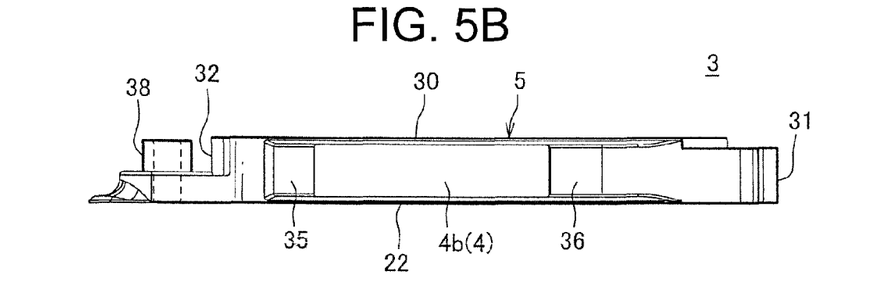
FIG. 5B is a bottom view illustrating the first arm.

Similarly to an embodiment of the first arm 3 illustrated in FIGS. 4, 5(a), and 5(b), the slit 4 surrounded on all sides by the plate wall portions 22, 30, 35, and 36, that is, the enclosure portion 5 is formed in an approximate chevron shape (the taper shape) in vertically cross-sectional view such that an opening 4b on the lower end side is widened and an opening 4a on the upper end side is narrowed when the first arm 3 is substantially horizontally positioned. The slit 4 is formed by being surrounded by the plate wall portions 22 and 30 on the front and back sides and the plate inclined walls 35 and 36 for guiding the harness in the front and rear parts, which constitutes the enclosure portion 5.

The inclined wall 35 on the front side (near the rotation tip) of the enclosure portion 5 includes a straight inner wall surface (use symbol 35 in substitution) and a small-radius bent surface 35a on the upper and lower ends (on the sides near the upper and lower openings 4a and 4b) of the inner wall surface 35. An outer wall surface 35b of the inclined wall 35 on the front side is connected to the step wall 32 (FIG. 5) on the rotation tip side through a rib 37. The inclined wall 36 on the rear side (near the rotational end side) is configured by an arc-shape wall portion 36a which is a part of the lower half portion of the circular annular wall 31 on the rotational base end side and a straight wall portion (use symbol 36 in substitution) which is straightly extended from the arc-shape wall portion 36a in a tangential direction, and the upper end (a portion on the opening 4a side on the upper side) of the straight wall portion 36 has a small-radius bent surface (end portion) 36b. On the narrow opening 4a side on the upper side of the slit 4, is formed a concave portion 47 having almost the triangle shape between the straight wall portion 36 and an annular wall 31 on the base end side.

In the first arm 3 of FIG. 4 as an example, a longitudinal length of the opening 4a on the upper side of the slit 4 is slightly shorter than a total sum of lengths of the inclined walls 35 and 36 in the front and rear parts, and the longitudinal length of the opening 4b on the lower side of the slit 4 is longer than a total sum of lengths of the inclined walls 35 and 36 in the front and rear parts.

Figure 7:
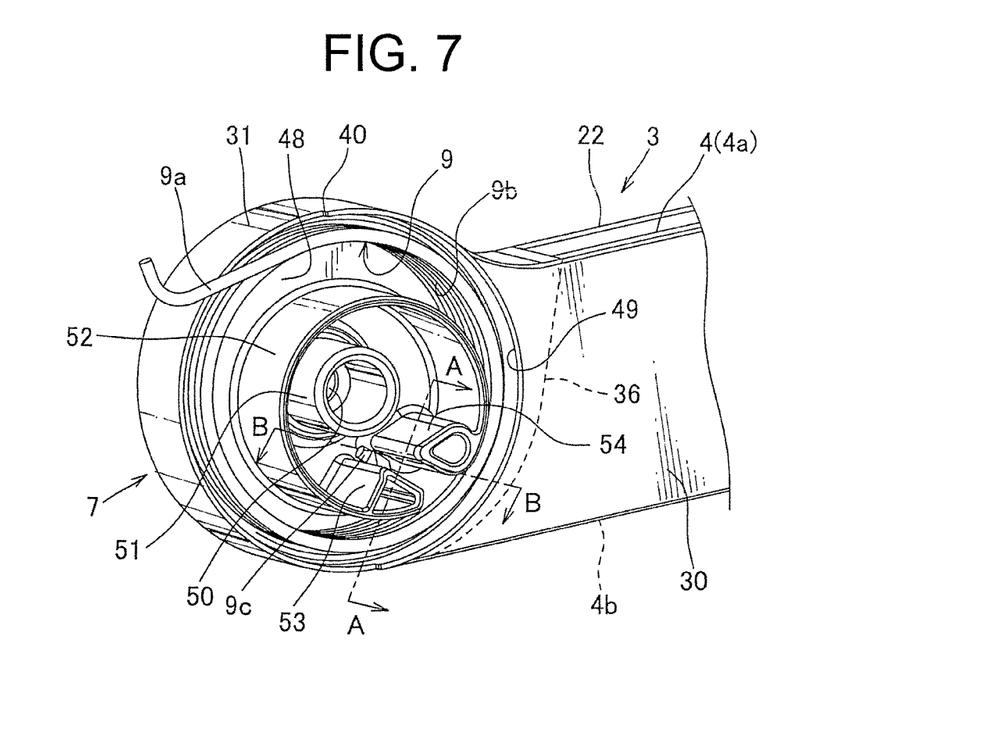
FIG. 7 is a perspective view illustrating an internal structure in which a spring member is included on a rotational base end side of the first arm.

As illustrated in FIGS. 5(a) and 5(b), a cylindrical bearing member 38 is integrally provided in the step portion 32 on the rear side of the rotation tip 6 of the first arm 3 to support the shaft 24 of the second arm 8 (FIG. 1) to be freely rotated. Further, a notch portion 40 is provided in the latter half of the annular wall 31 on the rotational base end side of the first arm 3 such that one end portion 9a of the spring member (the torsion coil spring) 9 of FIG. 7 is made to protrude to be engaged with a concave portion 39 of the partition wall 15 of the base member 2 of FIG. 1.

As illustrated in FIGS. 1, 2, 4, and 6, since the wire harness 28 is inserted (passing through) into the slit 4 of the first arm 3, the wire harness 28 freely moves in the longitudinal direction of the first arm 3 when the first arm 3 rotates according to opening and closing of the sliding door, and the movement of the wire harness 28 to the width direction of the first arm 3 is prevented so that the trajectory of the wire harness 28 becomes stable. Therefore, small-radius bending and folding of the wire harness 28 is prevented, so that the bending resistance is improved.

Further, as illustrated in FIGS. 1, 2, 4, and 5, since the wall portion 22 on the front (outer) side of the enclosure portion 5 of the first arm 3 serves as a cover of the power supply device in the related art, the movement of the wire harness 28 to the outside of the vehicle is regulated (prevented) and the interference between a member (the door inner panel 10 and the like) on the outside of the vehicle and the wire harness 28. Therefore, the cover used in the related art becomes unnecessary, and the power supply device 1 is simplified, miniaturized, lowered in cost, and reduced in weight.

Further, as illustrated in FIG. 5, the enclosure portion 5 of the first arm 3 includes the plate wall portions 22 and 30 parallel to each other on right and left sides and the inclined walls 35 and 36 inclined in an approximate chevron shape (the taper shape) facing each other in the front and rear parts, and the rigidity of the first arm 3 is increased by the respective wall portions 22, 30, 35, and 36 which constitute the enclosure portion 5 and are integrally formed in a surrounding frame shape, and the first arm 3 is reduced in weight by the surrounding wall portions 22, 30, 35, and 36 which are made relatively thin. It is a matter of course that the first arm 3 is reduced in weight by forming the slit 4 surrounded by the enclosure portion 5.

Further, as illustrated in FIG. 1, the front end portion (the peripheral end) 12a of the vertical base plate 12 of the base member 2 forms the end portion in the bent shape with the shaft 20 of the first arm 3 as almost the center, and approaches the inclined wall 36 on the rear side of the peripheral end portion 12a in the bent shape of the first arm 3 to be positioned (specifically, slightly protrudes forward from the inclined wall 36 on the rear side) in the vicinity of the upper end (end portion) 36b of the inclined wall 36, and thus the base member 2 is shortened in the longitudinal direction compared to the related art. The bent end portion 12a slightly protrudes forward from the inclined wall 36 on the rear side, so that the rotational base end portion 7 is reliably supported (received) to the first arm 3 by the base plate 12 and the smooth rotation of the first arm 3 is reliably secured.

Figure 6:
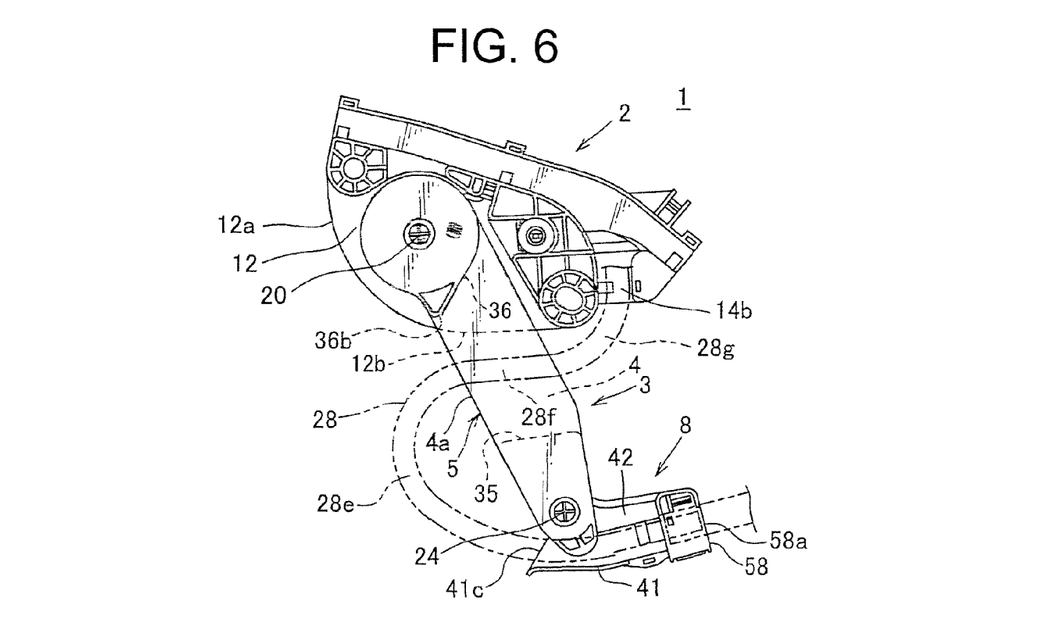
FIG. 6 is a front view illustrating an operation of the arm power supply device (a state when a sliding door is closed).

Further, similarly to the rotation state of the first arm 3 at the time when the sliding door is completely closed (when the sliding door is slid to the rear side of the vehicle) as illustrated in FIG. 6, an almost-horizontal lower end portion (the peripheral end) 12b formed continuously on the bent end portion (the peripheral end) 12a on the front side of the base plate 12 of the base member 2 is positioned in the vicinity of the lower end (the end portion 36b on the narrow opening 4a of the slit 4) of the inclined wall 36 on the rotational base end side of the enclosure portion 5 of the first arm 3, so that the base member 2 is shortened even in the upward and downward direction compared to the related art.

As illustrated in FIGS. 1 and 6, in a rotation range of the first arm 3, the peripheral ends 12a and 12b of the base member 2 are disposed in the vicinity of the end portion 36 of the enclosure portion 5 on the rotational base end side of the first arm 3. With the miniaturized base member 2 as described above, the power supply device 1 is lowered in cost, reduced in weight, and saves spaces, so that the power supply device 1 can be reliably mounted in a limited mounting space of the sliding door without interference with other mounted components.

The first arm 3 in FIG. 4 is located at a rotational position substantially at the same level or slightly lower than the time when the sliding door of FIG. 1 is the half-open state, and the wire harness 28 is in contact along the inclined wall 36 on the rear side (the rotational base end side) of the enclosure portion 5 of the first arm 3, so that the trajectory of the wire harness 28 is regulated and a bent shape in an approximate S shape of the wire harness 28 of FIG. 1 is maintained. Therefore, the small-radius bending such as the bending of the wire harness 28, and the bending tendency of the wire harness 28 according to the small-radius bending are reliably prevented. The inner surface of the inclined wall 36 on the rear side serves as a contact surface for guiding the wire harness 28.

As illustrated in FIG. 1, while being bent downward in the approximate semicircular shape from the harness fixing portion (the branch passage) 14b on a side near the rear portion of the base member 2, the wire harness 28 passes through the slit 4 in the enclosure portion 5 of the first arm 3 from the downwardly bent portion 28a (the harness insertion portion is denoted by symbol 28b) and bent upward in the approximate semicircular shape (the upwardly bent portion is denoted by symbol 28c), and is fixed by the binding band which is the harness fixing portion on the rotation tip side of the second arm 8 (the band insertion hole is denoted by symbol 45) and the cover portion 58 while being wired in the bent shape along the second arm 8 (the harness wired portion is denoted by symbol 28d).

As illustrated in FIGS. 1 and 2, the second arm 8 is formed to have about the half or slightly shorter than the length of the first arm 3, includes a bent gutter portion 41 on the front side (the upper side), a base wall 42 which is approximately straight on the rear side (the lower side), the shaft 24 which protrudes to the base end side of the base wall 42, and the cover portion 58 having a semicircular shape in cross-sectional view which is provided to be opened and closed by a thin hinge 41b in a portion 41a (FIG. 2) having a semicircular shape in cross-sectional view on the rotation tip side of the gutter portion 41. The cover portion 58 is engaged with the base wall 42 in a state of being closed by an engagement means (a claw portion and a hole portion) 43. The gutter portion 41 is offset from the shaft 24 to the front side (the upper side).

The wire harness 28, for example, wraps the end portion of the corrugate tube 60 through a tape winding portion (not illustrated) on an outer peripheral side of the end portion of the mesh tube 59 to be interposed and fixed into the cover portion 58 in a state where a plurality of electric lines are covered with a small-radius synthetic resin mesh tube (protection tube) 59 having a good bending property in a range from the base member 2 to the cover portion 58 of the second arm 8 and the plurality of electric lines are covered with a large-radius synthetic resin corrugate tube (protection tube) 60 also in a range from the cover portion 58 to the harness supporter on a side near the vehicle body through a connection portion between the sliding door and the vehicle body. In the inner surface of the cover portion 58 and in the facing inner surface of the gutter portion 41, a sharp projection may be provided to pass and fix the end portion of the corrugate tube 60 and the tape winding portion of the end portion of the mesh tube 59. As illustrated in FIG. 2, the base wall 42 of the second arm 8 is positioned in the step portion 32 on the rotation tip side of the first arm 3, a circular harness insertion space 44 in the cover portion 58 is positioned collinearly (on a vertical plane) to the slit 4 for inserting the harness of the first arm 3, and the wire harness 28 is bent in the upward and downward direction without deviation in position in the right and left direction from the cover portion 58 to the slit 4.

In a half-open state of the sliding door of FIG. 1, the first arm 3 is urged upward by an urging force of the spring member 9, the bent upper wall surface 46 on the front side formed continuously on the annular wall 31 on the base end side of the first arm 3 is in contact with the bent lower surface of the cylindrical fixing portion 17 on the front side of the base member 2, the upward rotation of the first arm 3 is prevented, the wire harness 28 is lifted up together with the first arm 3, and the bent harness portion 28a is prevented from being hanging down along the lower end 12b of the base member 2. The first arm 3 is slightly inclined upward from the horizontal level, the second arm 8 is inclined downward, and an angle α formed between both arms 3 and 8 becomes an obtuse angle of 90° or larger or an acute angle of 90° or smaller.

When the sliding door is further slid from the state of FIG. 1 to the rear side of the vehicle to be completely opened (the power supply device 1 retreats integrally with the sliding door), the wire harness 28 is pulled from the harness supporter (rotation clamp) (not illustrated) on the front side of the vehicle body with respect to the second arm 8, the second arm 8 rotates upward (the clockwise direction) about the shaft 24 on the base end side, the first arm 3 rotates downward (the counterclockwise direction) about the shaft 20 on the base end side, and both the arms 3 and 8 is extended on a substantially straight line.

At this time, the wire harness 28 is further extended in a straight line compared to FIG. 1, the harness portion 28*b* passed through in the slit 4 of the first arm 3 is in contact along the inclined wall 36 on the rear side of the slit 4 to be inclined upward as illustrated in FIG. 4, and the harness portion 28*c* on the upper side formed continuously on the inclined harness portion 28*b* and the harness portion 28*a* on the lower side are smoothly bent in a large radius, so that a small-radius bending which adversely affects the wire harness 28 is prevented and the bending resistance of the wire harness 28 is increased.

When the sliding door is slid from the half-open state of FIG. 1 to the front side of the vehicle to be completely closed, as illustrated in FIG. 6, the wire harness 28 is pulled to the rear side from the harness supporter (not illustrated) on the rear side of the vehicle body, the first arm 3 rotates downward about the shaft 20 on the base end side (the counterclockwise direction), and the second arm 8 rotates about the shaft 24 on the base end side to be substantially horizontal and slightly upward (the counterclockwise direction) on the lower side of the first arm 3. For example, the harness supporter (not illustrated) on a side near the vehicle body is disposed to the rear side to be separated from a rotation tip 58*a* of the second arm 8 of FIG. 6 by a distance equal to about two or more times the entire length of the first arm 3 to be substantially horizontal. The open angle formed between the both arms 3 and 8 in FIG. 6 is an obtuse angle of about 90°.

As illustrated in FIG. 6, the wire harness 28 is bent forward from a front end 41*c* of the gutter portion 41 of the second arm 8 (the forward bent portion is denoted by symbol 28*e*), passes through the slit 4 in the enclosure portion 5 of the first arm 3 (the insertion portion passing through the slit 4 is denoted by symbol 28*f*), bent upward on the rear side of the first arm 3 (the upwardly bent portion is denoted by symbol 28*g*), and connected to the harness fixing portion 14*b* on the lower rear side of the base member 2. In FIG. 6, the inclined wall 35 on the rotation tip side of the slit 4 of the first arm 3 is positioned substantially horizontal, and makes the wire harness 28 smoothly inserted in the slit 4 without causing interference with the inclined wall 35.

In an internal structure of the rotational base end portion 7 of the first arm 3 illustrated in FIG. 7, the annular wall (the peripheral wall) 31 is provided in the surrounding area of the circular wall portion (the bottom wall) 48 formed flush with the wall portion 22 on the surface side of the first arm 3, the edge portion on the front side of an opening 49 of the annular wall 31 is integrally connected to the wall portion 30 on the rear side of the first arm 3, and a hole portion 50 is provided to pass through the shaft 20 of the base member 2 of FIG. 3 for engagement at the center of the bottom wall 48.

Furthermore, a cylindrical wall 51 is provided to pass through the surrounding area of the hole portion 50 and engaged with the inner side of the cylindrical wall 26 of the surrounding area of the shaft 20 of the base member 2 of FIG. 3 to be freely rotated, a large-radius inner peripheral wall 52 in the substantially annular shape which is partially notched and decentered toward the opening 4*b* side as wide as the width of the slit 4 is provided in the surrounding area of the cylindrical wall 51, hollow column walls 53 and 54 are provided adjacent to each other in one and the other ends of the inner peripheral wall 52, and a coil portion 9*b* of the torsion coil spring 9 is contained between the inner peripheral wall 52 and an outer peripheral wall (the annular wall) 31 with a gap from the opening 49 and one straight end portion 9*c* which is bent inward the torsion coil spring 9 is inserted between the column walls 53 and 54.

Figure 8A:
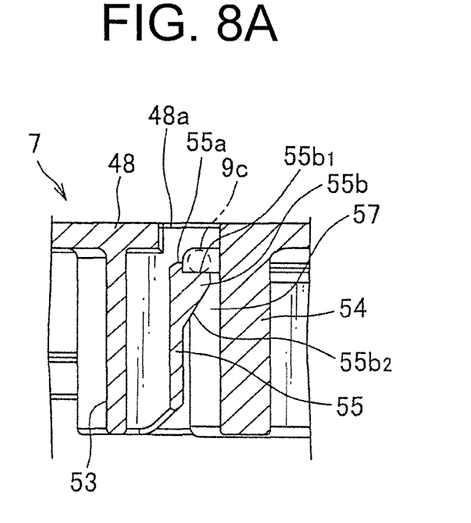
FIG. 8A is a cross-sectional view taken along line A-A of FIG. 7 diagram.
Figure 8B:
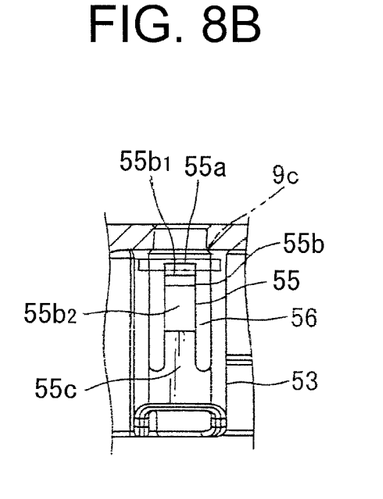
FIG. 8B is a cross-sectional view taken along line B-B of FIG. 7.

As illustrated in FIGS. 8(*a*) and 8(*b*), in the column wall 53, the flexible engagement arm (the engagement portion) 55 is integrally notched (the engagement arm 55 is separated from the column wall 53 by the slit 56 in the surrounding area), the engagement arm 55 includes a projection 55*b* on a side near a tip (free end) 55*a* in a near portion of the bottom wall 48 of the annular portion 31, and the projection 55*b* protrudes in a gap 57 between the column walls 53 and 54. The projection 55*b* includes an engagement surface $55b_1$ which is disposed to face the bottom wall 48 (specifically, a die punched hole 48*a*) of the annular portion 31 and parallel to the bottom wall 48 and a guide inclining surface $55b_2$ which faces the root (base end) 55*c* of the engagement arm 55 from the engagement surface $55b_1$, and the tip portion 55*a* of the straight engagement arm body 55 perpendicular to the engagement surface $55b_1$ protrudes toward the bottom wall 48. One end portion 9*c* of the torsion coil spring 9 is formed to go over the projection 55*b* of the engagement arm 55 and inserted between the column walls 53 and 54, and engaged with the projection 55*b* to prevent uncoiling.

Therefore, the entire torsion coil spring 9 is engaged by one engagement arm 55, and in a case where an operator assembles the first arm 3 mounted with the torsion coil spring 9 to the shaft 20 of the base member 2 (FIG. 3), even when the opening 49 of the annular wall 31 of the first arm 3 moves downward, it is prevented that the torsion coil spring 9 is fallen out of the annular wall 31, and assembly workability of the first arm 3 with the torsion coil spring 9 to the base member 2 is improved.

As illustrated in FIG. 7, the other end portion 9*a* of the torsion coil spring 9 is extended straight longer than one end portion 9*c* in a tangential direction of a coil winding portion 9*b* and passes through the notch portion 40 in the edge of the opening 49 of the annular wall 31 of the first arm 3 and a notch portion 21*a* of the lower annual wall 21 of the base member 2 of FIG. 3, and the extension tip portion 9*a* is bent outward and engaged with the groove (the concave portion) 39 on the partition wall 15 side of the base member 2 of FIG. 3. The inner edge portion 49 on the opening side of the annular wall 31 of the first arm 3 is rotatably guided along the outer peripheral surface of the annual wall 21 of the base member 2.

When the sliding door is closed as illustrated in FIG. 6, the torsion coil spring 9 of FIG. 7 is pulled by the rotation in the counterclockwise direction of the first arm 3 while the radius is reduced, and when the sliding door is opened as illustrated in FIG. 2, the first arm 3 is urged upward in the clockwise direction by a restoring force (elastic force) while the radius is increased.

In addition, the embodiment has been described about the sliding door on the left side of the vehicle, and the sliding door on the right side of the vehicle has the same configurations and actions except that the arrangement is symmetrical to the sliding door on the left side. Further, as a using method of the torsion coil spring 9, the torsion coil spring 9 may be pulled at the time of closing the sliding door while the radius is increased, and the torsion coil spring 9 may be restored at the time of opening the sliding door while the radius is reduced.

Further, the state when the sliding door is closed may be set to a state similar to a mirror-inverted (front and rear) state of FIG. 1, and the state when the sliding door is opened may be set to a state similar to a mirror-inverted (front and rear) state of FIG. 6. When the sliding door is closed (a period of time longer than the time when the sliding door is opened), the torsion coil spring 9 is recovered to a substantially free state, so that the stress on the torsion coil spring 9 is reduced. This configuration is desirable for a case where the wire harness 28 is slightly hanging down at the time when the sliding door is the half-open state.

Further, the arm power supply device may be applied to the sliding door of a vehicle other than that of automobile and the sliding door of an apparatus other than that of the vehicle. The sliding door is collectively referred to as a sliding structure, and the vehicle body and the apparatus body are collectively referred to as a fixed structure.

INDUSTRIAL APPLICABILITY

The arm power supply device according to the invention can be used to prevent the bending of the arm in the width direction, resolve the rattling of the wire harness and the instability of the trajectory, and improve the bending resistance of the wire harness. Furthermore, the structure of the power supply device can be miniaturized while eliminating the cover member. In addition, the spring member can be prevented from falling out of the arm.

REFERENCE SINGS LIST

1: Arm power supply device
2: Base member
3: First arm
4: Slit
5: Enclosure portion
6: Rotation tip side
8: Second arm
9: Torsion coil spring
9*c*: One end
12*a*, 12*b*: Peripheral end
14*b*: Branch passage (harness fixing portion)
28: Wire harness
36: Inclined wall
36*b*: End portion
55: Engagement arm (engagement portion)
58: Cover portion (harness fixing portion)

The invention claimed is:

1. An arm power supply device in which
a first arm is rotatably and axially supported to a base member having a first harness fixing portion,
a second arm having a second harness fixing portion is rotatably and axially supported on a rotation tip side of the first arm,
the first arm includes an enclosure portion forming a slit through which a wire harness is inserted,
the enclosure portion being constituted of a first wall portion and a second wall portion arranged opposed to each other with a space, and a third wall portion and a fourth wall portion intersecting with the first and the second wall portions and being arranged opposed to each other, and
the wire harness passes from the base member to the slit and is wired in a bent shape over the second arm,
wherein the enclosure portion includes an inclined wall located on a rotational base end side of the first arm at which the first arm is axially supported to the base member such that the wire harness extends in a bent shape over the second arm and is guided to be in contact with an inner surface of the inclined wall.

2. The arm power supply device according to claim 1, wherein a peripheral end of the base member is disposed in vicinity of an end portion of the enclosure portion on the rotational base end side of the first arm in a rotation range of the first arm.

3. The arm power supply device according to claim 1, wherein a torsion coil spring to urge the first arm in a rotation direction is contained on the rotational base end side of the first arm, and an engagement portion to engage one end portion of the torsion coil spring is provided on the rotational base end side.

4. The arm power supply device according to claim 2, wherein a torsion coil spring to urge the first arm in a rotation direction is contained on the rotational base end side of the first arm, and an engagement portion to engage one end portion of the torsion coil spring is provided on the rotational base end side.

* * * * *